United States Patent [19]
Ekart et al.

[11] Patent Number: 6,048,957
[45] Date of Patent: Apr. 11, 2000

[54] PROCESS FOR POLYESTERS WITH IMPROVED PROPERTIES

[75] Inventors: Michael Paul Ekart; James Earl Hataway, both of Kingsport, Tenn.; Perry Michael Murdaugh, Lexington; Gary Walton Popwell, Columbia, both of S.C.

[73] Assignee: Eastman Chemical Company, Kingsport, Tenn.

[21] Appl. No.: 09/065,990

[22] Filed: Apr. 24, 1998

Related U.S. Application Data

[60] Provisional application No. 60/045,373, May 1, 1997.

[51] Int. Cl.$^7$ ..................................... C08G 63/02
[52] U.S. Cl. ........................ 528/272; 528/296; 528/298; 528/300; 528/301; 528/302; 528/307; 528/308; 528/308.6
[58] Field of Search ..................... 528/272, 296, 528/298, 300, 301, 302, 307, 308, 308.6

[56] References Cited

U.S. PATENT DOCUMENTS

| | | |
|---|---|---|
| 4,064,112 | 12/1977 | Rothe et al. . |
| 4,340,721 | 7/1982 | Bonnebat et al. . |
| 4,591,629 | 5/1986 | El Ghatta et al. . |
| 5,241,046 | 8/1993 | Shiraki et al. . |
| 5,270,444 | 12/1993 | Shiraki et al. . |
| 5,362,844 | 11/1994 | Kerpes et al. . |
| 5,444,144 | 8/1995 | Tanaka et al. . |
| 5,510,454 | 4/1996 | Stouffer et al. . |
| 5,650,469 | 7/1997 | Long et al. . |

FOREIGN PATENT DOCUMENTS

| | | |
|---|---|---|
| 0 041 035 | 12/1981 | European Pat. Off. . |
| 0 222 714 | 5/1987 | European Pat. Off. . |
| 0 284 544 | 9/1988 | European Pat. Off. . |
| 1190801 | 5/1970 | United Kingdom . |
| 2 051 100 | 1/1981 | United Kingdom . |
| WO 96/30428 | 10/1996 | WIPO . |

OTHER PUBLICATIONS

Chemical Abstracts, vol. 89, No. 20, Nov. 13, 1978, Columbus, Ohio, abstract No. 164395, XP002074526.

Chemical Abstract, vol. 99, No. 18, Oct. 31, 1983, Columbus, Ohio, abstract No. 140626, XP002074527.

Database WPI, Section Ch, Week 8810, Derwent Publication Ltd., London, GB; Class A23, AN 88–068432, XP002074528.

*Primary Examiner*—Samuel A. Acquah
*Attorney, Agent, or Firm*—Karen A. Harding; Harry J. Gwinnell

[57] ABSTRACT

The present invention relates to a process for producing polyesters displaying exceptionally low acetaldehyde concentrations and good clarity comprising the steps of:

polycondensing in the melt phase, a polyester monomer/oligomer mixture under conditions sufficient to form a precursor having in intrinsic viscosity less than 75% of a possible maximum intrinsic viscosity; and solid stating said precursor under conditions sufficient to increase said intrinsic viscosity at least about 0.05 dl/g.

14 Claims, No Drawings

PROCESS FOR POLYESTERS WITH IMPROVED PROPERTIES

RELATED APPLICATION

This application claims the benefit of provisional application U.S. Ser. No. 60/045,373 filed May 1, 1997.

BACKGROUND OF THE INVENTION

Although acetaldehyde occurs naturally in many foods, in the manufacture of polyesters, it is an undesirable product of degradation reactions. Because acetaldehyde is detectable at very low levels, even small amounts can adversely affect the taste and odor of food or beverages such as water. In the manufacture of polyester containers, therefore, it is desirable to reduce the amount of acetaldehyde in the container sidewall which in turn minimizes the amount of acetaldehyde that is absorbed into the contents of the container. We have discovered a process for producing polyester resins that yield satisfactorily reduced levels of acetaldehyde in container sidewalls with improved clarity.

PRIOR ART

Much of the art devoted to low acetaldehyde levels in PET focuses on treatment of the polymer after melt-phase polycondensation. A number of processes have been proposed which contact solid polyester pellets with water vapor or liquid to reduce acetaldehyde. According to U.S. Pat. No. 4,591,629, the polyester should be treated prior to solid-state polycondensation, while in European Patent Application 222,714, gas containing water and carbon dioxide makes contact with the pellets during the crystallization step which precedes solid-state polycondensation. U.S. Pat. Nos. 5,270,444, 5,241,046, and 5,444,144 propose treating polyester with water following solid-stating polycondensation to reduce acetaldehyde.

U.S. Pat. No. 5,362,844 describes a process in which PET is polymerized to an intrinsic viscosity of at least 0.60 dl/g (preferably at least 0.65 dl/g) in a melt polycondensation reactor. Between the exit of the reactor and the exit of the pelletizer, the temperature of the PET is not increased and the residence time is sufficiently low so that the free acetaldehyde in the polymer is not increased by more than 30 ppm. The pellets are then hardened (a key step in the process), crystallized, and subjected to a drying (dealdehydization) step. Slight solid-state polycondensation of the PET occurs simultaneously with the dealdehydization.

U.S. Pat. No. 4,340,721 describes a process to prepare low acetaldehyde PET in which the polymer is polycondensed in melt phase to an intrinsic viscosity of 0.55 to 0.70 dl/g. An essential feature of the process is the intrinsic viscosity achieved in melt phase is between 75 and 90% of the maximum intrinsic viscosity obtainable; this maximum is defined as a threshold beyond which viscosity can no longer be increased at given operating conditions because degradation reactions dominate the polycondensation reaction.

DESCRIPTION OF INVENTION

According to the present invention, there is provided a process comprising the steps of:

polycondensing in the melt phase, a polyester monomer/oligomer mixture under conditions sufficient to form a precursor having an intrinsic viscosity less than 75% of a possible maximum intrinsic viscosity; and solid stating said precursor under conditions sufficient to increase said intrinsic viscosity at least about 0.05 dl/g.

The process of the present invention provides polyesters having improved properties for packaging, particularly reduced levels of acetaldehyde and improved clarity.

The process of the present invention further comprises a) esterification (or transesterification) of one or more dicarboxylic acids (or their dialkyl esters) to form a mixture of polyester monomer and oligomers; b) polycondensation to produce a low molecular weight precursor polymer having an intrinsic viscosity of less than 75% of a maximum attainable intrinsic viscosity; and c) crystallization and solid-state polycondensation to produce the desired product.

The polyesters are any crystallizable polyester homopolymer or copolymer that are suitable for use in packaging, and particularly food packaging. Suitable polyesters are generally known in the art and may be formed from aromatic dicarboxylic acids, esters of dicarboxylic acids, anhydrides of dicarboxylic esters, glycols, and mixtures thereof. More preferably the polyesters are formed from terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol, 1,4-butanediol, and mixtures thereof.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

In addition, the glycol component may optionally be modified with up to about 15 mole percent, of one or more different diols other than ethylene glycol. Such additional diols include cycloaliphatic diols preferably having 6 to 20 carbon atoms, aliphatic diols preferably having 3 to 20 carbon atoms and aromatic diols having 6 to 14 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of tri functional or tetrafunctional comonomers such as trimellitic anhydride, trimethylolpropane, pyromellitic dianhydride, pentaerythritol, and other polyester forming polyacids or polyols generally known in the art.

Because acetaldehyde is formed from ethylene glycol esters, the polyesters of the present invention contain an amount of ethylene glycol from about 1 to 100 mole % relative to the total glycols in the polyester and more preferably from about 85 to about 100 mole %.

Prior to the polycondensation portion of the melt-phase process, a mixture of polyester monomer (diglycol esters of dicarboxylic acids) and oligomers are produced by conventional, well-known processes. One such process is the esterification of one or more dicarboxylic acids with one or more glycols; in another process, one or more dialkyl esters of dicarboxylic acids undergo transesterification with one or more glycols in the presence of a catalyst such as a salt of manganese, zinc, cobalt, titanium, calcium, magnesium or lithium. In either case, the monomer and oligomer mixture is typically produced continuously in a series of one or more reactors operating at elevated temperature and pressures at one atmosphere or greater. Alternately, the monomer and oligomer mixture could be produced in one or more batch reactors. Suitable conditions for esterification and transesterification include temperatures between about 220° C. to about 250° C. and pressures of about 0 to about 20 psig.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas which does not cause unwanted reaction. Suitable gases include, but are not limited to partially or fully dehumidified air, $CO_2$, argon, helium and nitrogen. Catalysts for the polycondensation reaction include salts of antimony, germanium, tin, lead, or gallium, preferably antimony or germanium. Reactions conditions for polycondensation include a temperature less than about 290° C., and preferably between about 240° C. and 290° C. at a pressure sufficient to aid in removing undesirable reaction products such as ethylene glycol. The monomer and oligomer mixture is typically produced continuously in a series of one or more reactors operating at elevated temperature and pressures at one atmosphere or greater. Alternately, the monomer and oligomer mixture could be produced in one or more batch reactors.

A key feature of the invention is maintaining the intrinsic viscosity of the precursor produced by melt-phase polycondensation at a level significantly lower than that which could be obtained at the final reactor operating conditions. High intrinsic viscosities, greater than about 75% of the maximum attainable intrinsic viscosity at the reactor conditions, require relatively long residence times in the reactor since the degree of polymerization increases more slowly as the intrinsic viscosity approaches its maximum attainable value. Unfortunately, long residence times at this stage of processing generate much of the acetaldehyde and acetaldehyde precursors found in the polyester.

We have found that the intrinsic viscosity of the precursor produced in melt-phase polycondensation should be limited to less than 75% of the maximum intrinsic viscosity that could be attained at the operating conditions, preferably to less than 65% of the maximum attainable intrinsic viscosity, and more preferably to less than 55% of the maximum attainable intrinsic viscosity. The maximum intrinsic viscosity limitation was surprising as U.S. Pat. No. 4,340,721 states that if the precursor intrinsic viscosity is less than 75% of that attainable, the process is not a high-performance process. We find, however, that when producing precursor with lower intrinsic viscosities, higher production rates can be achieved, giving improved process performance, an advantage of the present invention. In addition, intrinsic viscosity of the polyester precursor should be less than 0.70 dl/g, preferably less than 0.65 dl/g, more preferably less than 0.60 dl/g.

Intrinsic viscosity is measured using 0.25 g polyester in 50 ml of 60:40 phenol/tetrachloroethane at 25° C.

Maximum attainable intrinsic viscosity for a particular catalyst system and finisher conditions (temperature and pressure) may be determined experimentally. About 25 g of polyester oligomer containing the desired catalyst system are melt polymerized at the temperature and pressure of interest in a flask. Several experiments were run at various polymerization times to find the maximum attainable intrinsic viscosity.

Another key feature of the invention is that the precursor is crystallized and undergoes further polycondensation in the solid state by conventional, well-known processes, such as those disclosed in U.S. Pat. No. 4,064,112. Solid-state polycondensation can be conducted in the presence of an inert gas as defined above, or under vacuum conditions, and in a batch or continuous process. The polyester can be in the form of pellets, granules, chips, or powder. Temperature during the solid-state polycondensation process should be maintained less than 240° C., preferably less than 230° C. The increase in intrinsic viscosity during solid-state polycondensation is at least about 0.05 dl/g, preferably at least about 0.10 dl/g. No hardening step is necessary prior to crystallization.

It is well known in the art that vinyl ester ends, formed by degradation reactions during polycondensation, can later form acetaldehyde during molding of packaging from the polyester resin. We believe that at least part of the success of the current invention occurs because there are fewer vinyl ends in the product.

By limiting the intrinsic viscosity of the precursor to below 75% of the maximum attainable intrinsic viscosity, residence time in melt-phase polycondensation is minimized, giving vinyl ends less time to form. In addition, at lower precursor intrinsic viscosities, the vinyl ends that are formed are more rapidly consumed by reactions with other end groups. Another advantage of maintaining lower precursor intrinsic viscosities is that more solid-state polycondensation is needed to attain the desired product intrinsic viscosity. We believe that a solid-state polycondensation step is necessary because the level of vinyl ends decreases during this part of the process. At the low temperatures characteristic of solid-state polycondensation, few vinyl ends are formed; however, many of the vinyl ends formed during melt-phase polycondensation can be consumed.

Additives which are known to reduce AA may also be added. Such additives include polyamides selected from the group consisting of low molecular weight partially aromatic polyamides having a number average molecular weight of less than 15,000, low molecular weight aliphatic polyamides having a number average molecular weight of less than 7,000 and wholly aromatic polyamides and polyesteramides as disclosed in U.S. Ser. No. 595,460. Suitable polyamides are disclosed in U.S. Ser. No. 548,162.

Other ingredients may be added to the compositions of this invention as desired to enhance the performance properties of the polyesters. For example, surface lubricants, denesting agents, stabilizers, antioxidants, ultraviolet light absorbing agents, mold release agents, metal deactivators, colorants, nucleating agents, phosphorus-containing stabilizers, reheat rate (enhancers, zeolites, fillers and the like may be added.

The following examples further illustrate the invention.

EXAMPLES

Poly(ethylene terephthalate) modified with 1.5 wt % diethylene glycol, 1.1 wt % 1,4-cyclohexanedimethanol, and an antimony-phosphorus catalyst system was produced as follows. Terephthalic acid was continuously esterified with ethylene glycol in a series of two reactors. The mixture of monomer and oligomer thus produced was then polycondensed in melt-phase to an intrinsic viscosity of 0.57 dl/g (which represents at most 53% of the maximum attainable intrinsic viscosity, which at the temperature, pressure, and catalyst levels employed was at least 1.08 dl/g).

The precursor underwent crystallization, followed by solid-state polycondensation at a temperature of about 215° C., reaching an intrinsic viscosity of 0.72 dl/g, making the increase in intrinsic viscosity during solid-state polycondensation 0.15 dl/g. The CDM color of the resin produced was $L^*=87.6$, $a^*=1.7$, and $b^*=0.9$. Water bottle parisons were injected molded from this polyester resin. Acetaldehyde content of the parisons was 3.0 ppm (by weight) maximum, well within the specification of 4.0 ppm.

COMPARATIVE EXAMPLE

Poly(ethylene terephthalate) modified with 1.5 wt % diethylene glycol, 1.1 wt % 1,4-cyclohexanedimethanol, and an antimony-phosphorus catalyst system was produced as follows. Terephthalic acid was continuously esterified with ethylene glycol in a series of two reactors. The mixture of monomer and oligomer thus produced was then polycondensed in melt-phase to an intrinsic viscosity of 0.66 dl/g under conditions where the maximum attainable Intrinsic viscosity was about 0.854 dl/g, or 77% of the maximum achievable intrinsic viscosity.

The precursor underwent crystallization, followed by solid-state polycondensation at a temperature of about 215° C., reaching an intrinsic viscosity of 0.80 dl/g, making the increase in intrinsic viscosity during solid-state polycondensation 0.14 dl/g. The CDM color of the resin produced was $L^*=82.5$, $a^*=-1.7$, and $b^*=1.0$. Water bottle parisons were injected molded from this polyester resin. Acetaldehyde content of the parisons was 4.5 ppm (by weight) maximum, above the specification of 4.0 ppm.

We claim:

1. A process comprising the steps of:
   polycondensing a polyester monomer/oligomer mixture under a set of melt polymerization conditions sufficient to form a precursor having an intrinsic viscosity less than 75% of a maximum attainable intrinsic viscosity for said precursor under said set of melt polymerization conditions; and
   solid stating said precursor under conditions sufficient to increase said intrinsic viscosity at least about 0.05 dl/g.

2. The process of claim 1 wherein said intrinsic viscosity is less than about 65% of the maximum attainable intrinsic viscosity.

3. The process of claim 1 wherein said intrinsic viscosity is less than about 55% of the maximum attainable intrinsic viscosity.

4. The process of claim 1 wherein said intrinsic viscosity in increased at least about 0.1 dl/g during solid stating.

5. The process of claim 1 further comprises the step of reacting at least one dicarboxylic acid with at least one glycol to form said polyester monomer/oligomer mixture.

6. The process of claim 5 wherein said at least one dicarboxylic acid is selected from the group consisting of aromatic dicarboxylic acids, esters of dicarboxylic acids, anhydrides of dicarboxylic esters, glycols, and mixtures thereof.

7. The process of claim 6 wherein said at least one dicarboxylic acid comprises a first dicarboxylic acid selected from the group consisting of terephthalic acid, dimethyl terephthalate, isophthalic acid, dimethyl isophthalate, dimethyl-2,6-naphthalenedicarboxylate, 2,6-naphthalenedicarboxylic acid and mixtures thereof.

8. The process of claim 6 wherein said at least one dicarboxylic acid comprises up to about 15 mole percent of at least one second dicarboxylic acid selected from the group consisting of aromatic dicarboxylic acids preferably having 8 to 14 carbon atoms, aliphatic dicarboxylic acids preferably having 4 to 12 carbon atoms, cycloaliphatic dicarboxylic acids preferably having 8 to 12 carbon atoms, and mixtures thereof.

9. The process of claim 8 wherein at least one second dicarboxylic acid is selected from the group consisting of phthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and mixtures thereof.

10. The process of claim 5 wherein said glycol comprises ethylene glycol.

11. The process of claim 10 wherein said glycol further comprises up to about 15 mole percent of at least one second glycol selected from the group consisting of cycloaliphatic diols having 6 to 20 carbon atoms, aliphatic diols having 3 to 20 carbon atoms and aromatic diols having 6 to 14 carbon atoms.

12. The process of claim 11 wherein said at least one second glycol is selected from the group consisting of diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and mixtures thereof.

13. The process of claim 11 wherein said at least one second glycol is selected from the group consisting of diethylene glycol, 1,4-cyclohexanedimethanol, 1,4-butanediol, and mixtures thereof.

14. The process of claim 1 wherein said polyester further comprises trifunctional or tetrafunctional comonomers selected from the group consisting of trimellitic anhydride, trimethylolpropane, pyromellitic dianhydride, and pentaerythritol.

* * * * *